(12) United States Patent
Dye et al.

(10) Patent No.: US 11,522,901 B2
(45) Date of Patent: *Dec. 6, 2022

(54) COMPUTER SECURITY VULNERABILITY ASSESSMENT

(71) Applicant: OPSWAT, Inc., San Francisco, CA (US)

(72) Inventors: Frank Dye, San Francisco, CA (US); Benjamin Czarny, San Francisco, CA (US); Bill Zhao, San Francisco, CA (US); Shae Anthony Bettencourt, San Francisco, CA (US); Yiyi Miao, San Mateo, CA (US)

(73) Assignee: OPSWAT, Inc., Tampa, FL (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/000,801

(22) Filed: Aug. 24, 2020

(65) Prior Publication Data

US 2020/0389483 A1 Dec. 10, 2020

Related U.S. Application Data

(63) Continuation-in-part of application No. 16/780,674, filed on Feb. 3, 2020, now Pat. No. 11,165,811, which (Continued)

(51) Int. Cl.
| | |
|---|---|
| *H04L 9/40* | (2022.01) |
| *G06F 21/57* | (2013.01) |
| *G06F 16/21* | (2019.01) |

(52) U.S. Cl.
CPC .......... *H04L 63/1433* (2013.01); *G06F 16/21* (2019.01); *G06F 21/577* (2013.01); *H04L 63/1425* (2013.01); *H05K 999/99* (2013.01)

(58) Field of Classification Search
CPC . H04L 63/1433; H04L 63/1425; G06F 16/21; G06F 21/577; H05K 999/99
See application file for complete search history.

(56) References Cited

U.S. PATENT DOCUMENTS

| | | | |
|---|---|---|---|
| 7,398,517 B2 * | 7/2008 | Berg | ................... G06F 11/3604 717/125 |
| 7,734,931 B2 | 6/2010 | Carter et al. | |

(Continued)

FOREIGN PATENT DOCUMENTS

| | | | | | |
|---|---|---|---|---|---|
| CN | 105324786 A | * | 2/2016 | ....... | G06F 16/24578 |
| KR | 20100024907 A | * | 3/2010 | ............. | G06Q 50/28 |
| WO | WO-2016085499 A1 | * | 6/2016 | ........... | G06F 21/552 |

OTHER PUBLICATIONS

US 2014/0283082 A1, 09/2014, Sharma (withdrawn)*
(Continued)

*Primary Examiner* — Shahriar Zarrineh
(74) *Attorney, Agent, or Firm* — MLO, a professional corp.

(57) ABSTRACT

A system receives binary data and first identification data. The binary data includes hashes of strings of bits, bytes, words or characters. The system receives vulnerability data and second identification data. The system determines a correspondence between the binary data and the vulnerability data based on matching the first identification data with the second identification data. The vulnerability data includes a country of origin for a product identified by the second identification data. The system generates a binaries-to-vulnerabilities database. The system scans target binary data from a target device to to find matches between the target binary data and the binary data using the binaries-to-vulnerabilities database. The system determines a known security vulnerability based on the results of the scanning and the correspondence between the binary data and the (Continued)

vulnerability data. The known security vulnerability includes the country of origin for the product in the target device.

18 Claims, 11 Drawing Sheets

Related U.S. Application Data is a continuation of application No. 16/174,139, filed on Oct. 29, 2018, now Pat. No. 10,554,681, which is a continuation of application No. 15/664,670, filed on Jul. 31, 2017, now Pat. No. 10,116,683, which is a continuation of application No. 15/275,123, filed on Sep. 23, 2016, now Pat. No. 9,749,349.

(56) References Cited

U.S. PATENT DOCUMENTS

| | | | |
|---|---|---|---|
| 7,895,656 | B1 | 2/2011 | Brock |
| 8,127,354 | B1 | 2/2012 | Bettini et al. |
| 8,266,703 | B1 | 9/2012 | Magdych et al. |
| 8,302,196 | B2 | 10/2012 | Soderberg et al. |
| 8,474,004 | B2 | 6/2013 | Leone |
| 8,613,086 | B2 | 12/2013 | Patel et al. |
| 8,645,340 | B2 | 2/2014 | Kester et al. |
| 8,654,340 | B2 | 2/2014 | Girard et al. |
| 8,813,222 | B1 | 8/2014 | Codreanu et al. |
| 8,850,583 | B1 | 9/2014 | Nelson et al. |
| 8,863,288 | B1 | 10/2014 | Savage et al. |
| 8,943,588 | B1 | 1/2015 | Speegle et al. |
| 9,195,809 | B1* | 11/2015 | Kaplan ............... G06F 21/577 |
| 9,304,980 | B1 | 4/2016 | Hartsook et al. |
| 9,350,752 | B2* | 5/2016 | Oliphant ............... G06F 21/50 |
| 9,516,055 | B1 | 12/2016 | Liu |
| 9,692,778 | B1* | 6/2017 | Mohanty ............ G06F 9/45533 |
| 9,716,727 | B1 | 7/2017 | Seger et al. |
| 9,871,815 | B2 | 1/2018 | Ouchn |
| 9,923,916 | B1* | 3/2018 | McClintock ........ H04L 63/1433 |
| 9,977,905 | B2* | 5/2018 | Li .......................... G06F 21/577 |
| 10,158,660 | B1* | 12/2018 | Reguly .................. G06F 21/55 |
| 10,666,676 | B1 | 5/2020 | Hsu et al. |
| 2002/0178383 | A1 | 11/2002 | Hrabik et al. |
| 2003/0195861 | A1* | 10/2003 | McClure ............. H04L 63/1408 |
| 2004/0006704 | A1 | 1/2004 | Dahlstrom et al. |
| 2005/0015760 | A1 | 1/2005 | Ivanov et al. |
| 2005/0022021 | A1 | 1/2005 | Bardsley et al. |
| 2005/0132206 | A1 | 6/2005 | Palliyil et al. |
| 2005/0138413 | A1* | 6/2005 | Lippmann ........... H04L 63/1433 726/4 |
| 2007/0011319 | A1* | 1/2007 | McClure ............. H04L 63/1433 709/224 |
| 2007/0067846 | A1 | 3/2007 | McFarlane et al. |
| 2007/0226794 | A1* | 9/2007 | Howercroft ............. G06F 21/56 726/22 |
| 2007/0271360 | A1 | 11/2007 | Sahita et al. |
| 2008/0098479 | A1 | 4/2008 | O'Rourke et al. |
| 2009/0119647 | A1 | 5/2009 | Kim et al. |
| 2010/0083346 | A1 | 4/2010 | Forman et al. |
| 2010/0100963 | A1 | 4/2010 | Mahaffey |
| 2010/0146143 | A1 | 6/2010 | Thorup |
| 2010/0175134 | A1 | 7/2010 | Ali-Ahmad et al. |
| 2011/0119765 | A1* | 5/2011 | Hering ................ H04L 63/1433 726/25 |
| 2011/0173693 | A1 | 7/2011 | Wysopal et al. |
| 2011/0179477 | A1* | 7/2011 | Starnes ................... G06F 21/52 726/9 |
| 2011/0209220 | A1 | 8/2011 | Tikkanen et al. |
| 2011/0211697 | A1 | 9/2011 | Volkovs |
| 2011/0321164 | A1* | 12/2011 | Saxena ................ G06F 21/577 726/25 |
| 2012/0017275 | A1 | 1/2012 | Harmonen |
| 2012/0072968 | A1 | 3/2012 | Wysopal et al. |
| 2012/0174230 | A1* | 7/2012 | Hoyt ...................... G06Q 10/06 726/25 |
| 2012/0222122 | A1 | 8/2012 | Das |
| 2012/0284221 | A1 | 11/2012 | Shelton et al. |
| 2012/0304244 | A1* | 11/2012 | Xie ......................... G06F 21/00 726/1 |
| 2012/0304300 | A1 | 11/2012 | LaBumbard |
| 2013/0055398 | A1 | 2/2013 | Li et al. |
| 2013/0055403 | A1 | 2/2013 | Pennington et al. |
| 2013/0096980 | A1* | 4/2013 | Basavapantna ........ G06Q 10/00 705/7 |
| 2013/0191919 | A1 | 7/2013 | Basavapatna et al. |
| 2013/0191920 | A1* | 7/2013 | Amit ....................... G06F 21/55 |
| 2013/0311496 | A1 | 11/2013 | Fedorenko et al. |
| 2013/0312102 | A1* | 11/2013 | Brake ................ H04L 63/1433 726/25 |
| 2014/0137190 | A1 | 5/2014 | Carey et al. |
| 2014/0137228 | A1* | 5/2014 | Shema .................... H04L 67/02 726/25 |
| 2014/0173737 | A1 | 6/2014 | Toback et al. |
| 2014/0173738 | A1 | 6/2014 | Condry et al. |
| 2014/0201843 | A1 | 7/2014 | Hibbert et al. |
| 2014/0331326 | A1 | 11/2014 | Thakur |
| 2015/0033120 | A1 | 1/2015 | Cooke et al. |
| 2015/0127607 | A1 | 5/2015 | Savage et al. |
| 2015/0193624 | A1* | 7/2015 | Tong ...................... G06F 21/577 726/25 |
| 2015/0207811 | A1 | 7/2015 | Feher et al. |
| 2015/0213272 | A1 | 7/2015 | Shezaf et al. |
| 2015/0242637 | A1 | 8/2015 | Tonn et al. |
| 2015/0248288 | A1 | 9/2015 | Murphy et al. |
| 2015/0326601 | A1 | 11/2015 | Grondin et al. |
| 2015/0363294 | A1 | 12/2015 | Carback et al. |
| 2015/0365437 | A1 | 12/2015 | Bell et al. |
| 2016/0006704 | A1 | 1/2016 | Maruyama |
| 2016/0065612 | A1 | 3/2016 | Evans et al. |
| 2016/0078231 | A1* | 3/2016 | Bach ...................... G06F 21/577 726/25 |
| 2016/0085970 | A1 | 3/2016 | Rebelo |
| 2016/0099963 | A1 | 4/2016 | Mahaffey et al. |
| 2016/0112444 | A1 | 4/2016 | Palumbo et al. |
| 2016/0188882 | A1 | 6/2016 | Mahrous et al. |
| 2016/0188885 | A1 | 6/2016 | Lee et al. |
| 2016/0232358 | A1 | 8/2016 | Grieco |
| 2016/0294849 | A1 | 10/2016 | Adams et al. |
| 2016/0300063 | A1 | 10/2016 | Daymont |
| 2016/0300065 | A1* | 10/2016 | Bang ...................... G06F 21/52 726/25 |
| 2016/0301707 | A1 | 10/2016 | Cheng et al. |
| 2016/0378994 | A1 | 12/2016 | Hibbert et al. |
| 2016/0381060 | A1 | 12/2016 | Floering |
| 2016/0381063 | A1 | 12/2016 | Oberheide et al. |
| 2017/0098087 | A1 | 4/2017 | Li |
| 2017/0286689 | A1 | 10/2017 | Kelley et al. |
| 2017/0318048 | A1 | 11/2017 | Htay |
| 2017/0357809 | A1 | 12/2017 | Smith |
| 2020/0159888 | A1* | 5/2020 | Ghose ................... G06F 9/3842 |

OTHER PUBLICATIONS

Mellor, FlashMate hybrid hard drive works without Windows, InfoWorld, Oct. 11, 2007. pp 1-2.
Mitchell, Web Security Pop-Up Trojan Making Rounds Again, This Time Attacking Both Windows and Macs, The Internet Patrol, May 9, 2011, pp. 1-4, Accessed on May 30, 2016, https://www.theinternetpatrol.com/websecuritypopuptrojanmakingroundsagainthistimeattackingbothwindowsandmacs/.
Notice of Allowance dated Jul. 6, 2018 for U.S. Appl. No. 15/664,670.
Notice of Allowance dated May 3, 2017 for U.S. Appl. No. 15/275,123.
Notice of Allowance dated Sep. 23, 2019 for U.S. Appl. No. 16/174,139.
Office Action dated Jan. 23, 2018 for U.S. Appl. No. 15/664,670.
Office Action dated May 1, 2019 for U.S. Appl. No. 16/174,139.
Office Action dated Nov. 30, 2016 for U.S. Appl. No. 15/275,123.
OS X El Capitan [OT], NeoGAF, May 27, 2016, p. 34, 3 pages,

(56) References Cited

OTHER PUBLICATIONS

Accessed on May 30, 2016, http://www.neogaf.com/forum/showthread.php?p=204835278.
Notice of Allowance and Fees dated Jul. 8, 2021 for U.S. Appl. No. 16/780,674.
Office Action dated Sep. 16, 2020 for U.S. Appl. No. 16/780,674.
Final Office Action dated Mar. 10, 2021 for U.S. Appl. No. 16/780,674.

* cited by examiner

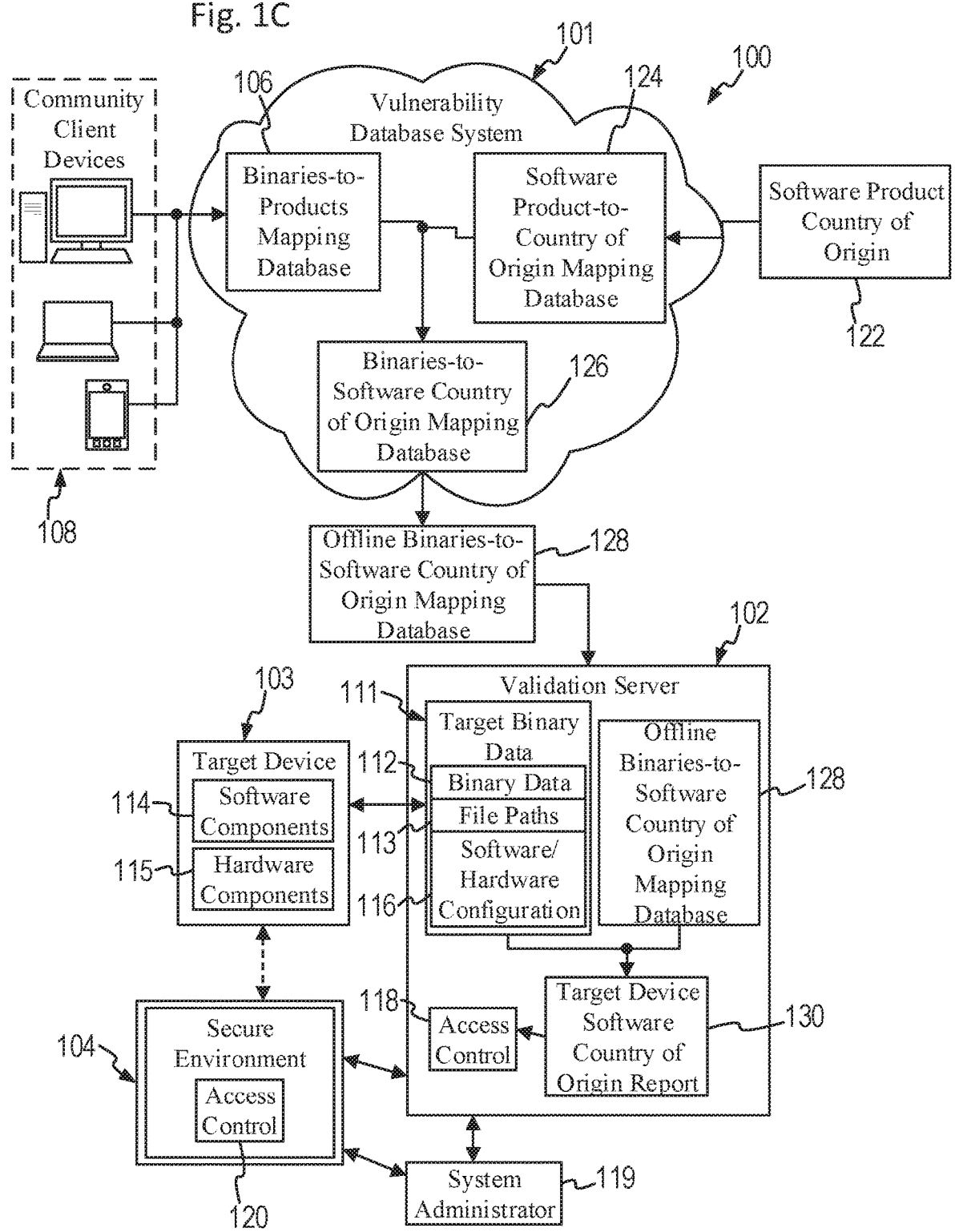

| Product | Version | Binary Files |
|---|---|---|
| ESET Endpoint Security | 5.0.2214.4 | Exe1_sha256, Exe2_sha256, Dll3_sha256, ... |
| ESET Endpoint Security | 5.0.1055.2 | Exe1_sha256, Exe4_sha256, Dll5_sha256, ... |
| ESET Endpoint Security | 4.2.3330.1 | Exe1_sha256, Exe2_sha256, Dll5_sha256, ... |
| ESET Endpoint Security | 4.0.1211.2 | Dll3_sha256, Dll5_sha256, Exe1_sha256, ... |
| JAVA | 7.11 | Dll9_sha256, Dll12_sha256, Dll13_sha256, ... |
| ... | ... | ... |

| Product | Version | Known Vulnerabilities |
|---|---|---|
| ESET Endpoint Security | 5.0.2214.4 | Vulner_1, Vulner_2, Vulner_3, Vulner_4, ... |
| ESET Endpoint Security | 5.0.1055.2 | Vulner_1, Vulner_2, Vulner_5, Vulner_6, ... |
| ESET Endpoint Security | 4.2.4230.1 | Vulner_1, Vulner_2, Vulner_7, Vulner_8, ... |
| ESET Endpoint Security | 4.0.1211.2 | Vulner_1, Vulner_2, Vulner_3, Vulner_6, ... |
| Adobe Flash | 3.0.5 | Vulner_2, Vulner_9, Vulner_10, ... |
| ... | ... | ... |

| Product | Version | Binary Files | Known Vulnerabilities |
|---|---|---|---|
| ESET Endpoint Security | 5.0.2214.4 | Exe1_sha256, Exe2_sha256, Dll3_sha256, ... | Vulner_1, Vulner_2, Vulner_3, Vulner_4, ... |
| ESET Endpoint Security | 5.0.1055.2 | Exe1_sha256, Exe4_sha256, Dll5_sha256, ... | Vulner_1, Vulner_2, Vulner_5, Vulner_6, ... |
| ESET Endpoint Security | 4.2.3330.1 | Exe1_sha256, Exe2_sha256, Dll5_sha256, ... | Vulner_1, Vulner_2, Vulner_4, Vulner_6, ... |
| ESET Endpoint Security | 4.0.1211.2 | Dll3_sha256, Dll5_sha256, Exe1_sha256, ... | Vulner_1, Vulner_2, Vulner_3, Vulner_6, ... |
| JAVA | 7.11 | Dll9_sha256, Dll12_sha256, Dll13_sha256, ... | |
| Adobe Flash | 3.0.5 | | Vulner_2, Vulner_9, Vulner_10, ... |
| ... | ... | | ... |

| Binary File | Known Vulnerabilities |
|---|---|
| Exe1_sha256 | Vulner_1, Vulner_2, ... |
| Exe2_sha256 | Vulner_4, ... |
| Exe4_sha256 | Vulner_5, ... |
| Dll3_sha256 | Vulner_3, ... |
| Dll5_sha256 | Vulner_6, ... |
| ... | ... |

Target Device Vulnerability Report

1. Binary_1, Hash_1, Filepath_1, [Vulner_1, Vulner_2, ... ]
2. Binary_2, Hash_2, Filepath_2, [Vulner_2, Vulner_4, ... ]
3. Binary_3, Hash_3, Filepath_3, [Vulner_3, Vulner_5, ... ]
   ...
N. Binary_N, Hash_N, Filepath_N, [Vulner_*, Vulner_**, ... ]

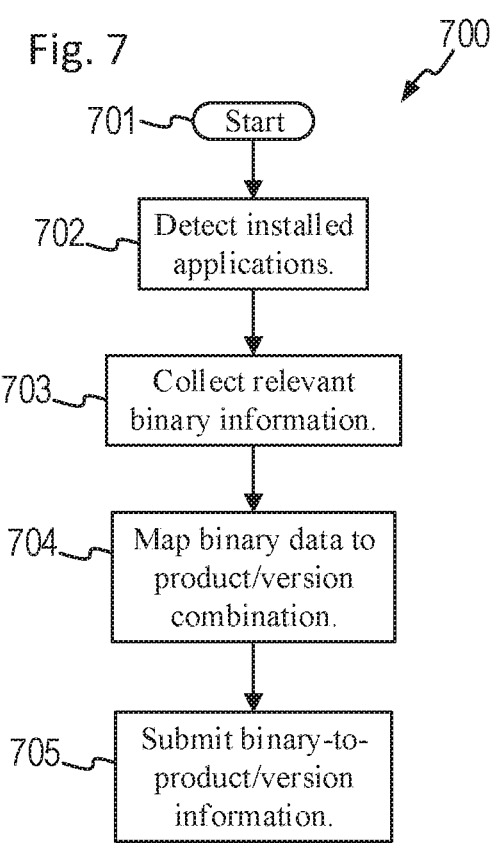

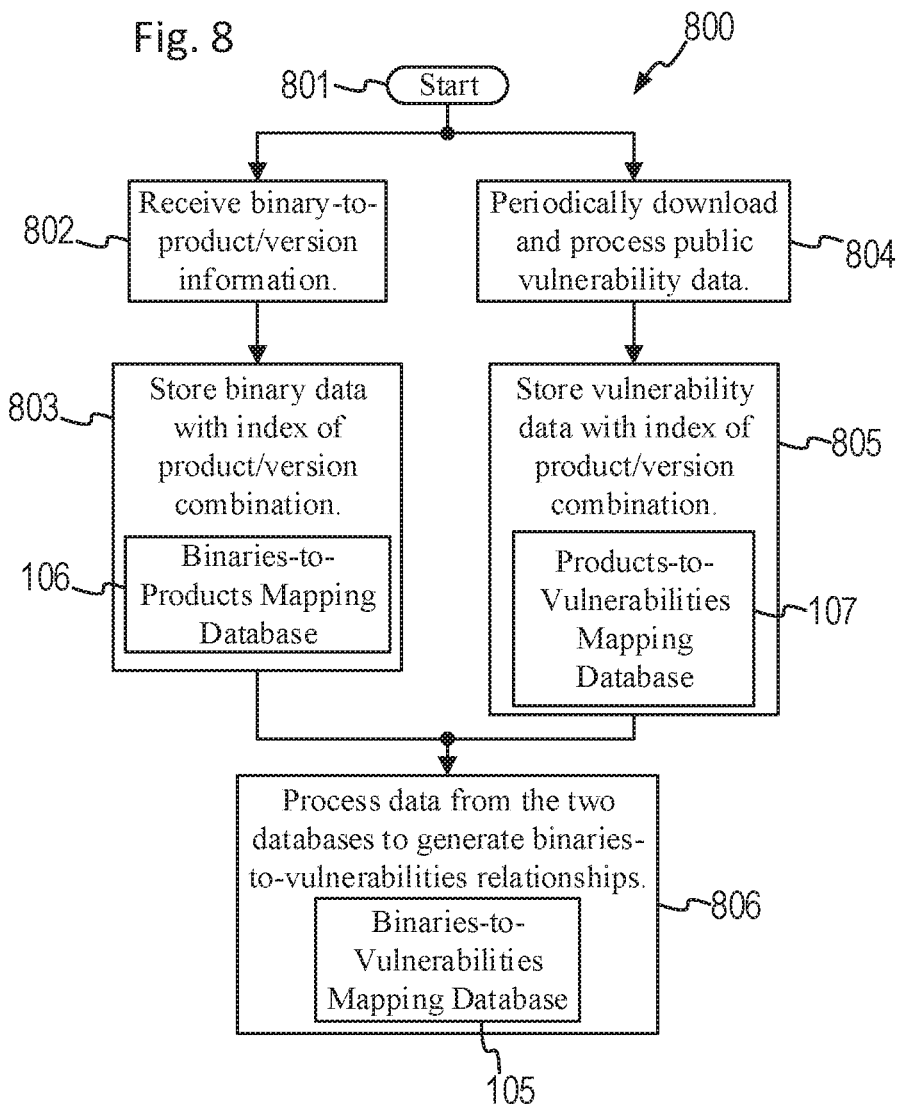
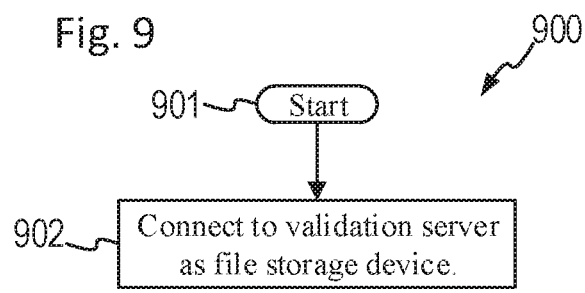

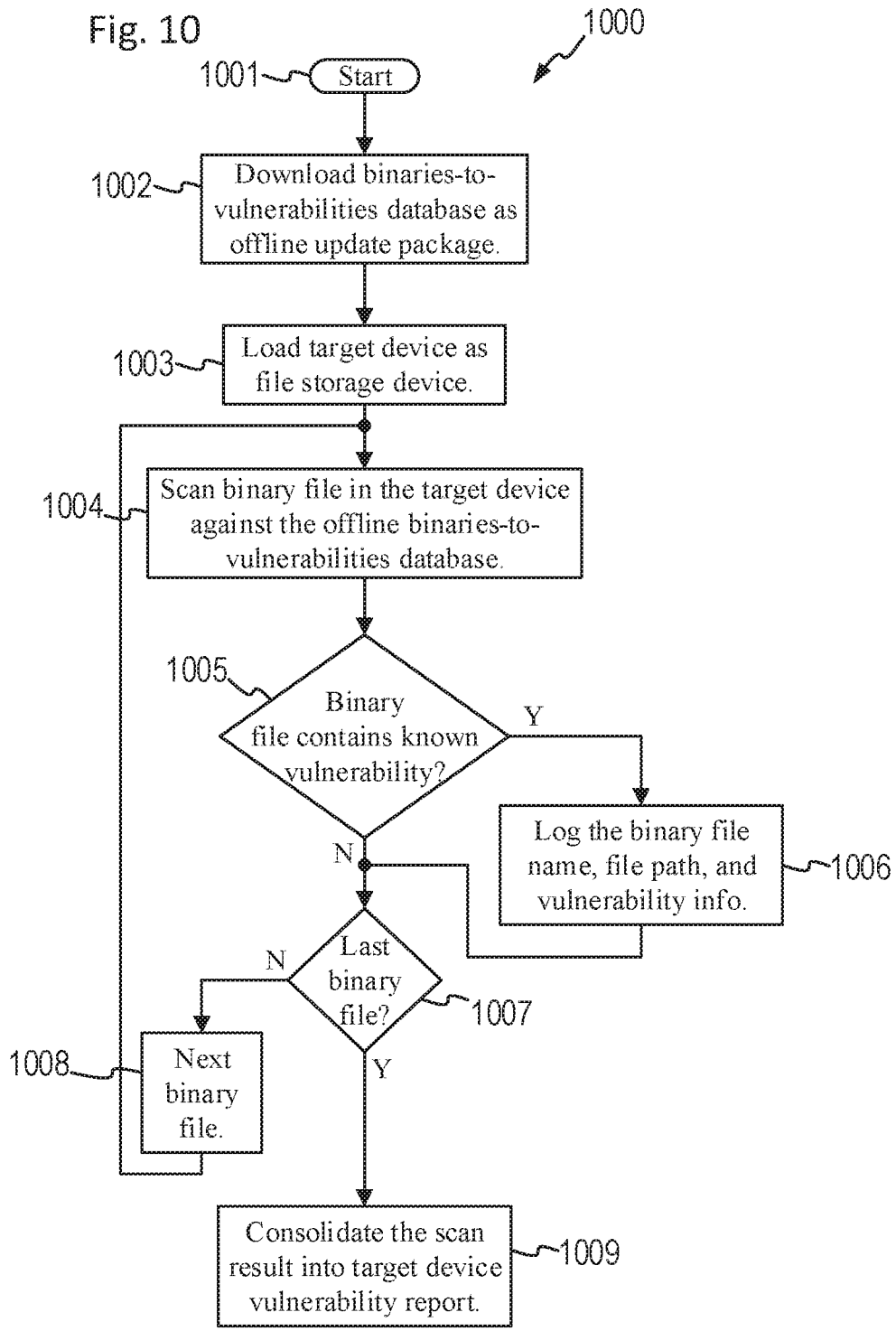

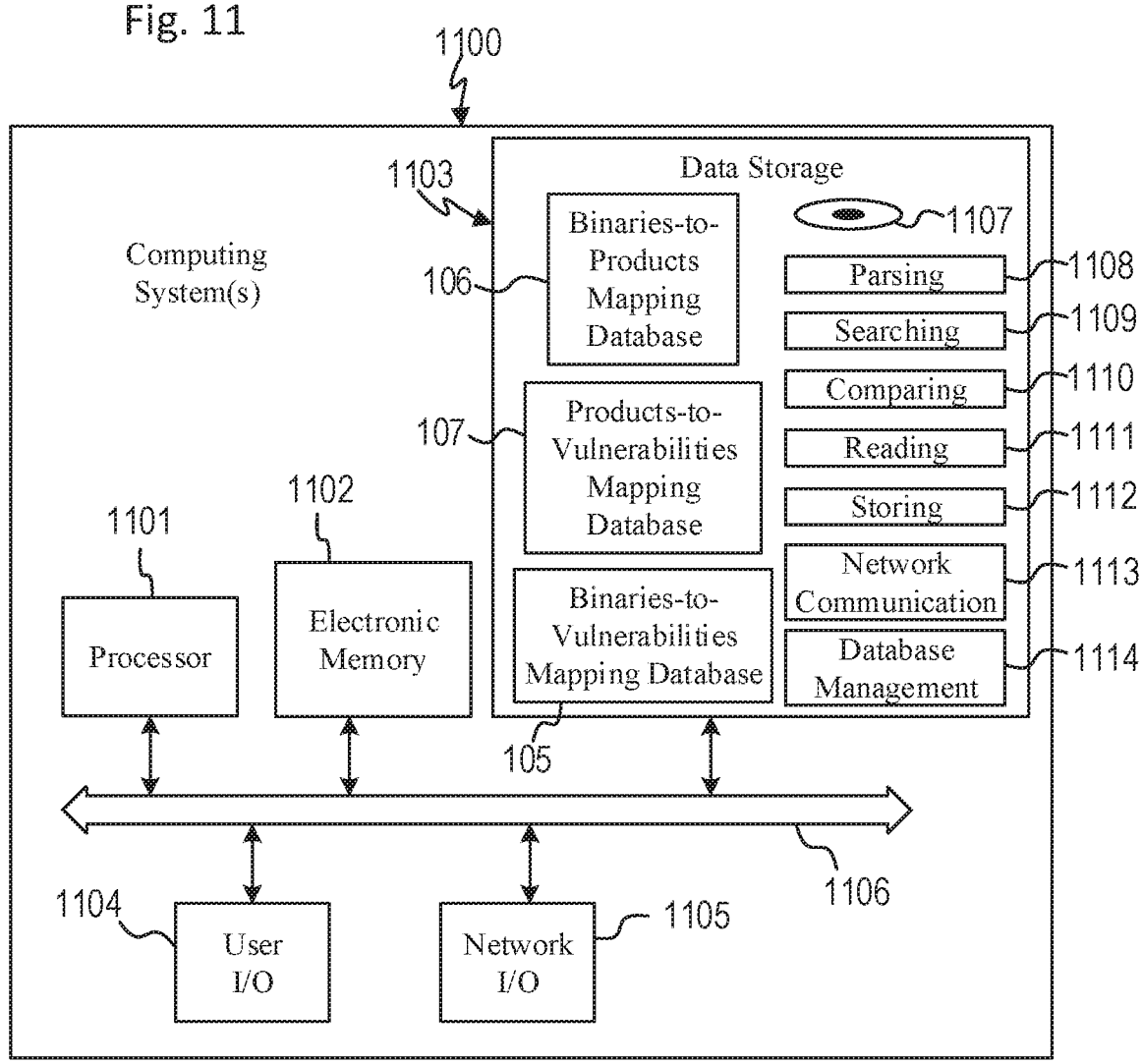

COMPUTER SECURITY VULNERABILITY ASSESSMENT

CROSS REFERENCE TO RELATED APPLICATIONS

This application is a continuation-in-part of U.S. patent application Ser. No. 16/780,674 filed Feb. 3, 2020, which is a continuation of U.S. patent application Ser. No. 16/174,139 filed Oct. 29, 2018, which is a continuation of U.S. patent application Ser. No. 15/664,670 filed Jul. 31, 2017, which is a continuation of U.S. patent application Ser. No. 15/275,123 filed Sep. 23, 2016; all of which are incorporated herein by reference in their entirety.

BACKGROUND OF THE INVENTION

Vulnerability assessment and malware detection are two fields or industries that deal with issues of computer security. A positive malware detection generally requires an immediate response to eliminate a threat to the computer device of a potentially imminent malicious event. Typically, the response is to quarantine, remove, or replace the software file of the malware. With a positive vulnerability assessment, on the other hand, the computer device can usually continue to operate without concern for a threat to the computer device, since a malicious event is not necessarily imminent. However, if the computer device is going to be used in an environment that has a particular security standard, then there is considerable concern over whether the computer device meets that security standard or would present a security problem for the environment. For example, if the computer device is to be used in a medical facility with a secure network through which the computer device will have access to confidential patient records, then it is very important to determine whether the computer device is hosting or executing any binary files that are known to be easy targets for hackers to gain access to the computer device and from there to any other computer or data storage device accessible through the secure network. Therefore, before the computer device can be granted access to the secure network, the vulnerability to malicious events of the computer device must be assessed, and any known vulnerabilities must be remedied or eliminated. The assessment must be thorough, robust, secure, quick and efficient, in order to prevent security problems, while allowing business operations to proceed with minimal interruption.

Determining the country of origin of software and hardware products is becoming increasingly important especially with regard to cybersecurity software. Some governments restrict the purchase of products that are not manufactured or substantially transformed in an approved country. Most software and hardware products are not readily labeled with the country of origin and it is difficult to determine the country of origin of software and hardware products.

SUMMARY OF THE INVENTION

In some embodiments, a more thorough, more robust, more flexible and more secure computer security vulnerability assessment is achieved with a method in which a computerized system receives product binary data and first product identification data that correspond to each other. The product binary data includes hashes of strings of bits, bytes, words or characters extracted from a file of a product. The computerized system receives product vulnerability data and second product identification data that correspond to each other. The computerized system determines a correspondence between the product binary data and the product vulnerability data based on matching the first product identification data with the second product identification data. The product vulnerability data includes a country of origin for a product identified by the second product identification data. The computerized system generates a binaries-to-vulnerabilities database based on the determined correspondence between the product binary data and the product vulnerability data. The computerized system scans target binary data from a target device to to find matches between the target binary data and the product binary data using the binaries-to-vulnerabilities database. The computerized system determines a known security vulnerability of the target device based on results of the scanning and the correspondence between the product binary data and the product vulnerability data. The known security vulnerability includes the country of origin for the product in the target device.

In some embodiments, a more thorough, more robust, more flexible and more secure computer security vulnerability assessment is achieved with a method in which a computerized system receives product binary data and first product identification data that correspond to each other. The product binary data includes hashes of strings of bits, bytes, words or characters extracted from files of software products. The computerized system receives product country of origin data and second product identification data that correspond to each other. The computerized system determines correspondence between the product binary data and the product country of origin data based on matching the first product identification data with the second product identification data. The computerized system generates a binaries-to-country of origin database based on the determined correspondence between the product binary data and the product country of origin data. The computerized system scans target binary data from a target device to find matches between the target binary data and the product binary data using the binaries-to-country of origin database. The computerized system determines a country of origin for a product of the target device based on results of the scanning and the correspondence between the product binary data and the product country of origin data.

In some embodiments, a more thorough, more robust, more flexible and more secure computer security vulnerability assessment is achieved with a method in which a computerized system receives product binary data and first product identification data that correspond to each other. The product binary data includes hashes of strings of bits, bytes, words or characters extracted from a file of a product. The computerized system receives product vulnerability data and second product identification data that correspond to each other. The computerized system determines a correspondence between the product binary data and the product vulnerability data based on matching the first product identification data with the second product identification data. The computerized system generates a binaries-to-vulnerabilities database based on the determined correspondence between the product binary data and the product vulnerability data. The computerized system scans target binary data from a target device to to find matches between the target binary data and the product binary data using the binaries-to-vulnerabilities database. The computerized system determines a known security vulnerability of the target device based on results of the scanning and the correspondence between the product binary data and the product vulnerability data.

In some embodiments, the computerized system grants access by the target device to a secure environment based on determining that the target device has no known security vulnerability, and denies access by the target device to the secure environment based on determining that the target device has the known security vulnerability. In some embodiments, the product vulnerability data describes a vulnerability to a malicious event of a computer device that contains a software product corresponding to the product binary data, regardless of whether the software product is infected with malicious code. In some embodiments, the computerized system collects the product binary data and the first product identification data from a plurality of client devices, and each client device collects the product binary data and the first product identification data related to software products that are on that client device and maps the product binary data to the corresponding first product identification data for each of the software products. In some embodiments, the target device is a computer that has been turned off. In some embodiments, the computerized system loads the target device as an external storage device. In some embodiments, the computerized system generates an assessment result or report containing at least a listing of designations of the binary data that was found to match the binary files, and designations of the vulnerability data that correspond to the binary data that was found to match the binary files. In some embodiments, the computerized system receives an indication of one of a first, second or third level of vulnerability assessment to be performed on the target device. In the first level of vulnerability assessment, the target binary files are executable binary files. In the second level of vulnerability assessment, the target binary files are the executable binary files and library files used by the executable binary files. In the third level of vulnerability assessment, the target binary files are all binary files stored on the target device.

BRIEF DESCRIPTION OF THE DRAWINGS

FIGS. 1B and 1C are example computer security vulnerability assessment systems that associate the software component on a target device with its country of origin, in accordance with some embodiments.

FIGS. 2-5 are simplified database structures for use by, or generated by, the example computer security vulnerability assessment system shown in FIGS. 1A-1D, in accordance with some embodiments.

FIG. 6 is a simplified report generated by the example computer security vulnerability assessment system shown in FIGS. 1A-1D, in accordance with some embodiments.

FIGS. 7-10 are simplified flowcharts of processes performed by components of the example computer security vulnerability assessment system shown in FIGS. 1A-1D, in accordance with some embodiments.

FIG. 11 is a simplified schematic diagram of a vulnerability database system for use in the example computer security vulnerability assessment system shown in FIGS. 1A-1D, in accordance with some embodiments.

DETAILED DESCRIPTION OF THE INVENTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1A:
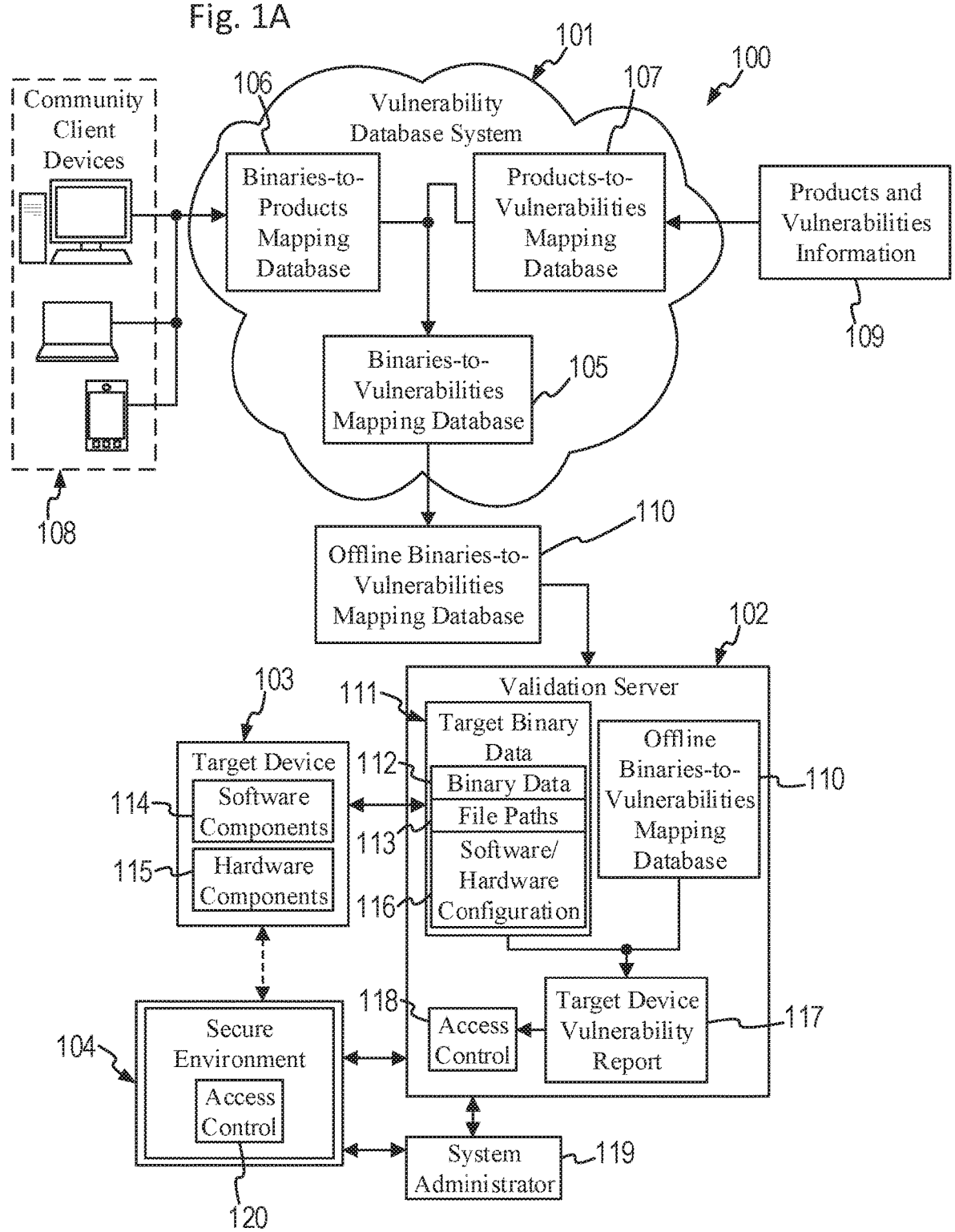
FIG. 1A is a simplified schematic diagram of an example computer security vulnerability assessment system, in accordance with some embodiments.

FIG. 1A shows an example computer security vulnerability assessment system 100 that provides a more thorough, robust, flexible and secure computer security vulnerability assessment, in accordance with some embodiments. The illustrated embodiment with the components shown is provided for explanatory purposes only, and other embodiments could use other specific components or combinations of components. In the illustrated embodiment, the computer security vulnerability assessment system 100 generally includes a vulnerability database system 101 and a validation server 102. The validation server 102 generally uses data generated by the vulnerability database system 101 to assess a security vulnerability of a target device 103, e.g., as a means for network or domain access control for determining whether to grant access by the target device 103 to a secure environment 104, for determining whether to transfer the target device 103 from a lower security domain or environment to a higher security domain, for a security compliance check procedure, for performing a data security transfer, or for determining a computer device's "health." To do so, the vulnerability database system 101 generally associates binary data (related to software products, or specific versions of the software products, i.e. "product binary data") with known security vulnerabilities (of the same software products, or specific versions thereof, i.e. "product vulnerability data"). The validation server 102 then scans (i.e., reads and searches through) binary data from the target device 103 (i.e. "target binary data") to determine whether any of the target binary data matches the product binary data, thereby establishing a link to the product vulnerability data. Known security vulnerabilities of the target device 103 are thus determined by this scan of binary data. Based on this security vulnerability determination, the computer security vulnerability assessment system 100, or an administrator thereof, can further determine whether to grant access by the target device 103 to the secure environment 104.

The binary data (for the product binary data or the target binary data) generally contains 1) binary hashes of binary level files of the software products, 2) binary hashes of strings of bits, bytes, words or characters extracted from the files of the software products, 3) the unprocessed strings of bits, bytes, words or characters that were extracted, 4) the complete binary level files of the software products, or 5) any other appropriate binary-level representation of the software products. In various embodiments, therefore, the scanning of the target binary data and the matching with the product binary data is done at the individual bit, byte, word, character, string, etc. level, e.g., as can be performed with the "find" or "findstr" command available in the Windows™ command prompt or other string, binary, or file matching or comparing type of function. The scanning and matching searches for a match between two files or two strings within two files at the low level of binary data, rather than matching a file name or other higher level meta data of two files.

The binary data is distinguished from data that simply identifies the software products or applications, e.g., the name and version of the software products or the file names or meta data of application files associated with, or mapped to, the software products. Conventional security vulnerability assessment systems use such file identification data (to determine which software products are on the target device 103 and then to assess the security vulnerability of the target device 103 in accordance therewith). However, this conventional technique is less thorough, robust or flexible than the present system, because it could potentially miss some known vulnerabilities, since the actual binary level data in the files of the software product could be different from the official version of the software product. For example, some of the files could be corrupted or infected with malware, which would not be detected by a conventional vulnerability assessment system that simply looks at file identification data. The computer security vulnerability assessment system 100, thus, can be used in place of a conventional security vulnerability assessment system, or in combination therewith, to enable a more thorough, robust and flexible level of functionality that is not available in conventional security vulnerability assessment systems.

Additionally, a vulnerability scan or assessment is distinguished from a malware scan or detection procedure. Vulnerability assessment attempts to determine whether a computer device is vulnerable to a malicious event, such as malware infection, hacking, intrusion, data corruption, data theft, spoofing, phishing, etc., regardless of whether the computer device is actually compromised by any type of malicious code or software. In a sense, vulnerability is similar to a security defect in the software that an external third party could take advantage of to take control of or damage the computer device. Thus, a vulnerability may render the computer device susceptible to malware. However, a vulnerability is not necessarily a problem, since no malicious event may have occurred, and the computer device and the software products can continue to perform in an acceptable manner. Malware detection, on the other hand, generally attempts to determine whether a computer device or software product has been infected with any known type of malicious code or software, such as a virus, a trojan, etc., and usually results in a recommendation of whether the software product or malicious code should be removed from, or not be allowed to run on, the computer device. Thus, although a malware scan may look at binary data, the result is a determination of whether a file or computer device is actually infected, rather than being simply vulnerable to infection, such that there is a clear and present danger that renders the computer device or the software products incapable of performing in an acceptable manner. Additionally, in some situations, it is possible to find malware on a computer without necessarily finding a security vulnerability. The computer security vulnerability assessment system 100, thus, performs a different function than, and takes a distinctly different view of security issues from, a malware detection system.

The vulnerability database system 101 is generally a computerized system (e.g., one or more computer devices or a central server implemented in a cloud-based computing environment) for generating and maintaining a large binaries-to-vulnerabilities mapping database 105. The binaries-to-vulnerabilities mapping database 105 associates binary data with known security vulnerabilities by establishing links between the binary data (related to software products, or specific versions of the software products) and the known security vulnerabilities (of the same software products, or specific versions thereof). Thus, formation of the binaries-to-vulnerabilities mapping database 105 is based on a determined correspondence between the product binary data and the product vulnerability data.

In some embodiments, the vulnerability database system 101 collects or gathers information to generate the binaries-to-vulnerabilities mapping database 105. The collected information is generally in the form of a binaries-to-products mapping database 106 and a products-to-vulnerabilities mapping database 107. The binaries-to-products mapping database 106 contains links between the product binary data and corresponding product version identification data (e.g., the binary data may be linked to the product version identification data of according to each binary file's absolute file path, file property information, digital signature, copyright, etc.). The products-to-vulnerabilities mapping database 107 contains links between product vulnerability data (e.g., known security vulnerabilities) and the corresponding product version identification data.

A conventional vulnerability assessment system, for example, typically uses data similar to that in the products-to-vulnerabilities mapping database 107. The vulnerability database system 100, however, goes further by matching the product version identification data in the two databases 106 and 107 to determine links or correspondences between the product binary data and the product vulnerability data and to generate the binaries-to-vulnerabilities mapping database 105 in accordance therewith.

In some embodiments, the product binary data and the corresponding product version identification data for the binaries-to-products mapping database 106 is received from various community client devices 108. The community client devices 108 are generally any appropriate computer devices, such as desktop computers, notebook computers, tablet computers, smartphones, servers, etc. A community client application running on the community client devices 108 generally scans the binary files of the software products that have been installed on the community client devices 108 and generates the product binary data therefrom. The various community client applications map the product binary data (e.g., including complete file binary data for a binary hash of the file binary data) to the corresponding product version identification data (e.g., including file names, product names, vendor names, product version designators, product category, etc.) and submits this information to the vulnerability database system 101. The community client devices 108, therefore, submit to the vulnerability database system 101 real data for the product binary data from actual usage of the software products in the field, rather than relying on the documented versions of the software products. In this manner, the vulnerability database system 101 also takes into consideration more than just generally available software; for example, support is provided for custom or unofficial versions of software (that a vendor may make available to only one or a few special users) and beta software releases. The vulnerability database system 101 can cross reference different submissions from different community client devices 108, process the received information, and store the information in the binaries-to-products mapping database 106. Alternatively, the binaries-to-products mapping database 106 could be generated from an existing file information service or from copies of the files of the software products. However, a benefit of using the community client devices 108 to produce the product binary data and the corresponding product version identification data is the ability to normalize the data and improve the accuracy of binary ownership.

In some embodiments, the product vulnerability data and the corresponding product version identification data for the products-to-vulnerabilities mapping database 107 is received from various products and vulnerabilities information 109. There are a variety of products and vulnerabilities information 109 for known product vulnerability and severity information, including CVE (Common Vulnerabilities and Exposures), NVD (National Vulnerability Database) and OSVDB (Open Sourced Vulnerability Database). The products and vulnerabilities information 109 generate vulnerability data that is specific to a given product and version combination. The vulnerability database system 101 periodically downloads this information, processes this information, and forms the products-to-vulnerabilities mapping database 107 therefrom.

The validation server 102 is generally a computerized system for using the binaries-to-vulnerabilities and mapping database 105 to assess the security vulnerability of the target device 103 and thereby validate the target device 103 for use in the secure environment 104. The validation server 102 represents any number of computer devices at any number of locations, such as at multiple business operation facilities, where it may be necessary to assess the security vulnerability of other computer devices (e.g., multiple target devices 103) before validating those devices and granting them access to secure network domains. In some embodiments, the validation server 102 downloads an offline copy of the binaries-to-vulnerabilities mapping database 105 (the offline binaries-to-vulnerabilities mapping database 110). Additionally, the validation server 102 receives target binary data 111 (from the target device 103) that generally includes binary data 112 (in the same form as that described above for the product binary data was), and a file path 113, for each of the binary files scanned from the target device 103.

The target device 103 is generally any appropriate computer device that a user may use to access the secure environment 104, such as a desktop computer, notebook computer, tablet computer, smartphone, server, etc. In some embodiments, the target device 103 is capable of being loaded as an external storage device by the validation server 102 when the target device 103 is turned off. In this manner, the various files (for the target binary data 111) contained in the target device 103 can be safely read by the validation server 102 in the same manner as reading data files from any mass storage device (e.g., a hard drive, optical drive, flash memory device, etc.) while the target device 103 is not operating and cannot present a vulnerability risk.

Additionally, since the vulnerability scan performed by the vulnerability database system 100 is performed by the validation server 102, rather than by the target device 103, no additional software for scanning purposes needs to be installed on the target device 103. This technique is in contrast with conventional security vulnerability assessment systems that require the target device to be turned on in order to run the vulnerability assessment scan. The software that needs to be executed on the target device to perform a conventional vulnerability scan could potentially affect the security vulnerability of the target device. This potential issue is avoided by using the target device 103 as an external storage device for the validation server 102, particularly when the target device 103 is turned off before being loaded as the external storage device, since there is no chance that the security vulnerability of the target device 103 could be affected by this scanning technique.

In some situations, security vulnerability can depend on the particular combination of different software products on the same device. Additionally, sometimes security vulnerability can depend on the particular combination of software products with hardware products on the same device. Therefore, in some embodiments, data for combinations of software components 114 and hardware components 115 in the target device 103 forms at least part of the target binary data 111 (e.g., software/hardware configuration data 116).

Using the product binary data of the offline binaries-to-vulnerabilities mapping database 110, the validation server 102 scans through the target binary data 111 to find matches between the target binary data 111 and the product binary data. Using any matches (results of the scanning) and the product vulnerability data of the offline binaries-to-vulnerabilities mapping database 110, the validation server 102 consolidates the information and generates a target device vulnerability assessment result or report 117 therefrom. The target device vulnerability report 117 generally includes the binary data 112, the file paths 113, and the known vulnerabilities. Alternatively, in some embodiments, generation of the target device vulnerability report 117 is optional. In some embodiments, this data is returned via an API (application programming interface) or any other form of programming communication methodology.

Given the target device vulnerability report 117, either an access control application 118 or a system administrator 119 can analyze the security vulnerability level of the target device 103 to determine whether to grant or deny access by the target device 103 to the secure environment 104. In some embodiments, the security vulnerability level may be provided as a score value indicating a level of vulnerability of the target device 103. For example, the security vulnerability level may be zero if no known vulnerabilities are found, a low value if only a few vulnerabilities are found, or a high value if a relatively large number of vulnerabilities are found. In some embodiments, the target device 103 may have no known security vulnerability if no vulnerabilities with a risk level over a particular risk threshold have been discovered. In some embodiments, the security vulnerability level may be simply a pass/fail determination. In some embodiments, to grant access by the target device 103, an access control application 120 that manages access to the secure environment 104 is configured (e.g., by the access control application 118 or the system administrator 119) to allow the target device 103 to connect to any network or computer devices within the secure environment 104.

Figure 1B:
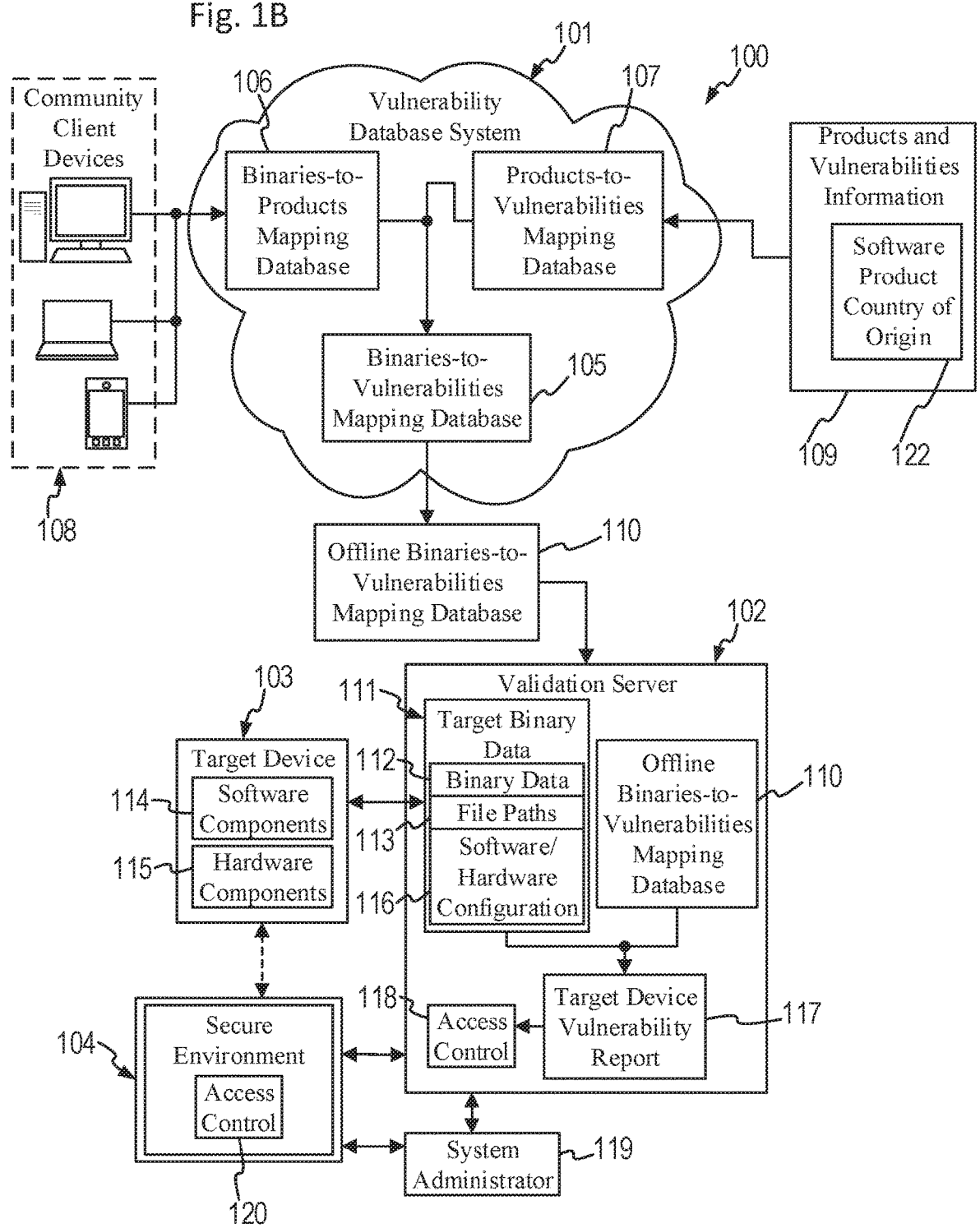

Federal regulations, executive orders, laws or court decisions may be passed which force organizations to audit software components and/or hardware components functioning on their computer systems for country of origin. Software components may include software products, programs, executable files or applications running on a computering system. Hardware components may include physical parts in the computering system such as central processing units, transceivers, input devices, output devices and storage devices, among other components. The computer security vulnerability assessment system 100 provides a way to quickly assess all of the products such as the software components 114 or hardware componets 115 on the computing system and associates those products with their country of origin. FIG. 1B is an example computer security vulnerability assessment system 100 that associates the software component 114 on a target device with its country of origin, in accordance with some embodiments. Referring to FIG. 1B, some portions of the computer security vulnerability assessment system 100 are similar to the description and implementation of FIG. 1A.

The products and vulnerabilities information 109 may include a software product country of origin 122 for the product identified by the second product identification data. The software product country of origin 122 may be associated with a name of the product and an address of a business entity that makes or markets the product. The software product country of origin 122 may be generated from a signing authority, public address, pubic information or a press release. In some scenarios, the country of origin may need to be researched such as when the business entity is registered in one country but the development of the product occurred in another country via a subsidiary or contractor.

The computer security vulnerability assessment system 100 determines the correspondence between the product binary data and the product vulnerability data based on matching the first product identification data with the second product identification data. The product vulnerability data includes a country of origin for the product identified by the second product identification data. The binaries-to-to-vulnerabilities mapping database 105 is generated based on the determined correspondence between the product binary data and the product vulnerability data. Following the system flow of FIG. 1B, the products-to-vulnerabilities mapping database 107, the binaries-to-to-vulnerabilities mapping database 105 and the offline binaries-to-vulnerabilities mapping database 110 include the software product country of origin 122.

As described herein, using the binaries-to-to-vulnerabilities mapping database 105 or the offline binaries-to-vulnerabilities mapping database 110, the validation server 102 scans through the target binary data 111 to find matches between the target binary data 111 and the product binary data. The validation server 102 determines a known security vulnerability of the target device 103 based on the results of the scanning and the correspondence between the product binary data and the product vulnerability data. The known security vulnerability includes the software product country of origin 122 for the product on the target device 103. Accordingly, an assessment result or target device vulnerability report 117 may be generated and includes associating the product on the target device 103 with the software product country of origin 122. The target device vulnerability report 117 may further include the binary data 112, the file paths 113, and the known vulnerabilities.

In some embodiments, auditing all of the software components 114 or products on the computing system and associating the software components 114 with their country of origin may be a separate process from the implementation of FIG. 1B of determining a known security vulnerability of the target device 103 which includes the software product country of origin 122 information. FIG. 1C is an example computer security vulnerability assessment system 100 that associates a software component 114 on the target device 103 with its country of origin, in accordance with some embodiments. In some embodiments, this may be performed before, after or concurrently with the implementation of FIG. 1A for determining a known security vulnerability of the target device.

For example, in some embodiments, the binaries-to-products mapping database 106 contains links between the product binary data and corresponding product version identification data (e.g., the binary data may be linked to the product version identification data of according to each binary file's absolute file path, file property information, digital signature, copyright, etc.) such as described with reference to FIGS. 1A and 1B. A products-to-country of origin mapping database 124 contains links between the software product country of origin 122 and the corresponding product version identification data. The software product country of origin 122 data may be specific to a given product and version combination. The vulnerability database system 101 periodically downloads this information, processes this information, and forms the products-to-country of origin mapping database 124. The vulnerability database system 100 matches the product version identification data in the two databases 106 and 124 to determine links or correspondences between the product binary data and the software product country of origin 122 to generate the binaries-to-software country of origin mapping database 126.

In some embodiments, the validation server 102 downloads an offline copy of the binaries-to-software country of origin mapping database 126 which creates an offline binaries-to-software country of origin database 128. The validation server 102 uses the binaries-to-software country of origin mapping database 126 (or the offline binaries-to-software country of origin database 128) to determine the country of origin of the software component 114 by scanning the target device 103. The validation server 102 represents any number of computer devices at any number of locations, such as at multiple business operation facilities, where it may be necessary to assess the country of origin of the products on other computer devices (e.g., multiple target devices 103). The validation server 102 determines the country of origin for the software components 114 of the target device 103 based on the results of the scanning and the correspondence between the product binary data and the software product country of origin 122 data. An assessment result or a target device software country of origin report 130 may be generated which associates the software component 114 in the target device 103 with the country of origin. The target device software country of origin report 130 may be used as an audit result to meet regulatory requirements.

For example, the validation server 102 scans the target device 103 and discovers Adobe Photoshop as a software component 114. The validation server 102 associates the binary data with Adobe Photoshop and Adobe Photoshop is further associated with the company, Adobe Inc. Using the binaries-to-software country of origin mapping database 126, it is determined that Adobe Inc. is listed as a US Delaware Corporation with the country of origin of United States. This may be repeated for all software components 114 of the target device 103. The results may be aggregated to create the target device software country of origin report 130 so the country of origin of all software components 114 are documented.

Figure 1D:
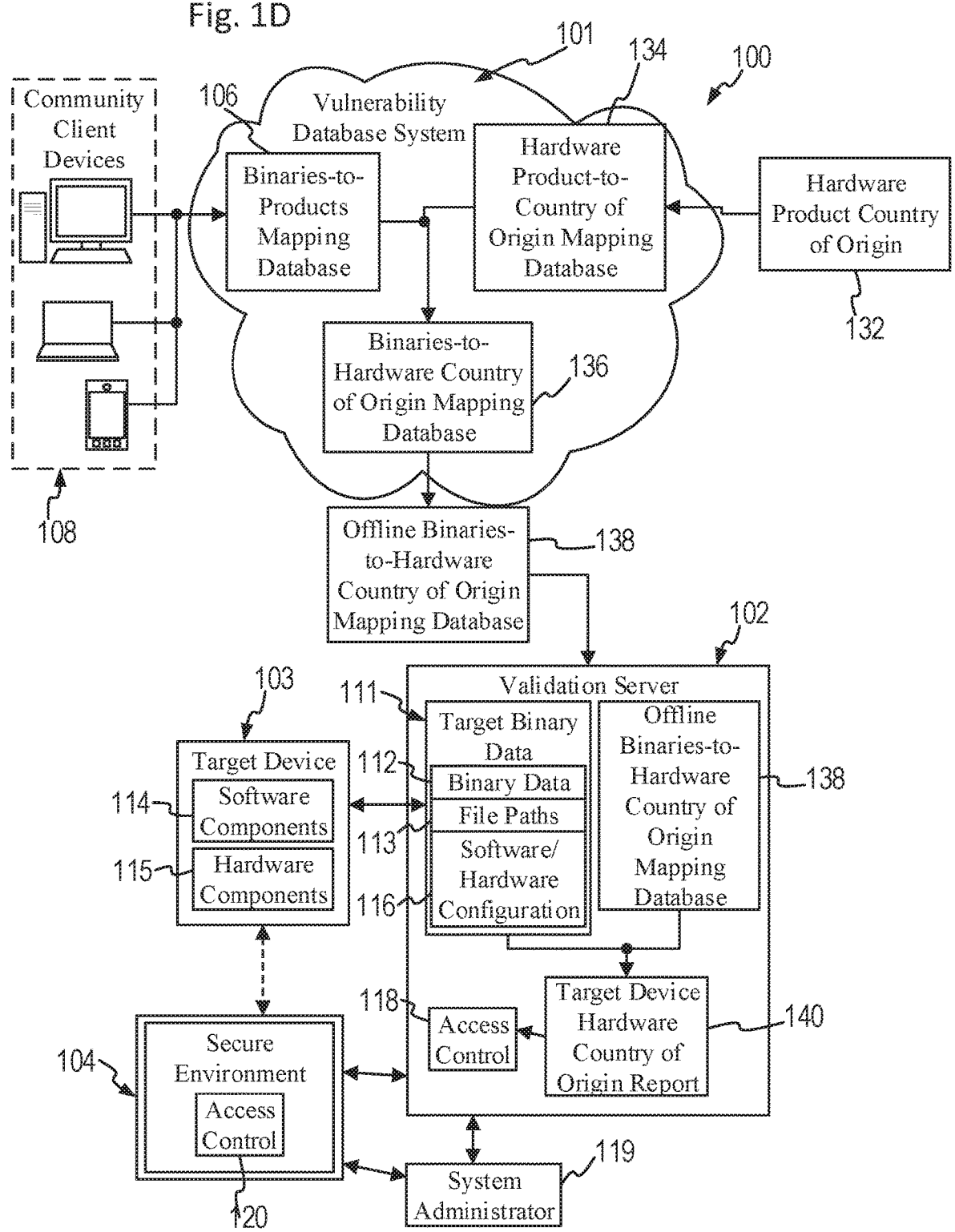
FIG. 1D is an example computer security vulnerability assessment system that associates the hardware component on a target device with its country of origin, in accordance with some embodiments.

The country of origin for each product on the target device 103 may also be generated for the hardware components 115. FIG. 1D is an example computer security vulnerability assessment system 100 that associates the hardware component 115 on a target device 103 with its country of origin, in accordance with some embodiments. In some embodiments, auditing all of the hardware components 115 on the target device 103 and associating the hardware component 115 with its country of origin may be similar to the implementation of FIG. 1C with respect to the software components 114. In some embodiments, the process is separate from determining the known security vulnerability of the target device 103. In some embodiments, the process may be performed before, after or at the same time as determining the known security vulnerability of the target device 103 or determining the country of origin of the software component 114 the the target device 103.

For example, a hardware products-to-country of origin mapping database 134 contains links between a hardware product country of origin 132 and the corresponding product version identification data. The hardware product country of origin 132 data may be specific to a given hardware component 115 and version combination. The vulnerability database system 100 matches the product version identification data in the two databases 106 and 134 to determine links or correspondences between the product binary data and the hardware product country of origin 132 to generate the binaries-to-hardware country of origin mapping database 136.

In some embodiments, the validation server 102 downloads an offline copy of the binaries-to-hardware country of origin mapping database 136 which creates an offline binaries-to-hardware country of origin database 138. The validation server 102 uses the binaries-to-hardware country of origin mapping database 136 (or the offline binaries-to-hardware country of origin database 138) to determine the country of origin of the hardware component 115 by scanning the target device 103. The validation server 102 determines the country of origin for the hardware component 115 of the target device 103 based on the results of the scanning and the correspondence between the product binary data and the hardware product country of origin 132 data. An assessment result or a target device hardware country of origin report 140 may be generated which associates the hardware component 115 on the target device 103 with the country of origin. The target device hardware country of origin report 140 may be used as an audit result to meet regulatory requirements.

FIG. 2 shows an example for a simplified database structure for the binaries-to-products mapping database 106, and FIG. 3 shows an example for a simplified database structure for the products-to-vulnerabilities mapping database 107, in accordance with some embodiments. In this embodiment, the binaries-to-products mapping database 106 includes fields for the name of each individual software product, the version designator for the version of the software product, and the corresponding binary files containing the product binary data for the software product. Additionally, the products-to-vulnerabilities mapping database 107 includes fields for the name of each individual software product, the version designator for the version of the software product, and the corresponding vulnerability files containing the product vulnerability data for known vulnerabilities for the software product.

FIG. 4 shows an example for a simplified database structure for an intermediate database 400 that combines the data from the binaries-to-products mapping database 106 and the products-to-vulnerabilities mapping database 107, in accordance with some embodiments. Using the data from the databases 106 and 107, the vulnerability database system 101 generates the intermediate database 400 to include fields for the name of each individual software product (from databases 106 and 107), the version designator for the version of the software product (from databases 106 and 107), the binary files containing the product binary data for the software product (from database 106), and the vulnerability files containing the product vulnerability data for known vulnerabilities for the software product (from database 107). The intermediate database 400, therefore, provides a link between the binary files containing the binary data and the known vulnerabilities. With additional processing of the intermediate database 400 by the vulnerability database system 101, the links between the individual binary files and the corresponding known vulnerabilities are determined, and the binaries-to-vulnerabilities mapping database 105 is generated therefrom, e.g., as shown in FIG. 5. In other embodiments, the vulnerability database system 101 processes the data from the databases 106 and 107 to generate the binaries-to-to-vulnerabilities mapping database 105 without forming the intermediate database 400.

FIG. 5 shows an example for a simplified database structure for the binaries-to-vulnerabilities mapping database 105, in accordance with some embodiments. In this embodiment, the binaries-to-vulnerabilities mapping database 105 includes fields for the binary files containing the product binary data for each the software product and the corresponding vulnerability files containing the product vulnerability data for known vulnerabilities related to the product binary data in the binary files. Additionally, the simplified database structure for the binaries-to-vulnerabilities mapping database 105 shown in FIG. 5 is also provided for the offline binaries-to-vulnerabilities mapping database 110 downloaded and used by the validation server 102.

FIG. 6 shows an example for a simplified database structure for the target device vulnerability report 117, in accordance with some embodiments. In some embodiments, the security vulnerability of the target device 103 is provided as a listing of the designation of the binary data, the binary hash data, and the file path of the binary file (from which the data was extracted or generated) along with a designation or description of the known vulnerabilities that correspond to be binary data. In the illustrated example, Binary_1 is a designation of a particular instance of binary data in the offline binaries-to-vulnerabilities mapping database 110 that was found to match a particular instance of binary data in a binary file that was read from the target device 103. Additionally, Hash_1 is a hash of the binary data, or alternatively a designation of a particular instance of a hash of the binary data. Filepath_1 is the file path for locating the binary file (on the target device 103) that matched the particular instance of binary data in the offline binaries-to-vulnerabilities mapping database 110. Vulner_1, Vulner_2, etc. are designations or descriptions of the known vulnerabilities that have been linked to, or correspond to, the particular instance of binary data. At a minimum, the report generally includes the designations of the binary data and the known vulnerabilities. With the addition of the file path information, the system administrator 119 of the validation server 102, the access control application 118, or a user of the target device 103 can quickly locate the vulnerable binary files in the target device 103 in order to remove them, replace them, or take other actions.

FIG. 7 shows a simplified flow chart of a process 700 performed by the community client application running on the community client devices 108 to produce the product binary data and the corresponding product version identification data for the binaries-to-products mapping database 106. The particular steps, order of steps, and combination of steps is shown for explanatory purposes only. Other embodiments may use other steps or combinations of steps or in a different order to perform the same general function. Additionally, one or more applications or routines can perform the process 700.

Upon starting (at 701), the community client application detects (at 702) the applications or software products installed on the community client device 108. Thus, the community client application reads and stores the file names and file paths for all of the software products contained or installed in the community client device 108. Alternatively, the community client application can read this information from a preexisting listing in the community client device 108. At 703, the community client application collects the relevant binary information or data for each of the detected application. Thus, the community client application reads the binary data for the files of each detected application and then either generates and stores a hash of the binary data or stores the original binary data. In some embodiments, the community client application collects or generates this data with an endpoint assessment software available with such products as the OESIS Framework™ by Opswat, Inc., including Metadefender Endpoint Management™, as well as other solutions, Cisco AnyConnect™, F5 BIG-IP™, or similar types of products. At 704, the community client application maps, links or correlates the binary data (e.g., the hash or the original data) to the product and version combination. Thus, the community client application generates and stores information that links the binary data, the software product name, the version of the software product, the file name for the application of the software product, and any other appropriate information with which to form binary-to-product/version information. At 705, the community client application submits the binary-to-product/version information to the vulnerability database system 101. Thus, the community client application causes the community client device 108 to generate file transfer packets and transmit them through a network (e.g., the Internet, a LAN, a WAN, etc.) to the vulnerability database system 101. In some embodiments, the community client device 108 submits the information via a REST (representational state transfer) API post action to the vulnerability database system 101.

FIG. 8 shows a simplified flow chart of a process 800 performed by the vulnerability database system 101 to produce the binaries-to-vulnerabilities mapping database 105. The particular steps, order of steps, and combination of steps is shown for explanatory purposes only. Other embodiments may use other steps or combinations of steps or in a different order to perform the same general function. Additionally, one or more applications or routines can perform the process 800.

Upon starting (at 801), the vulnerability database system 101 receives (at 802) the binary-to-product/version information from the community client device 108. Thus, the vulnerability database system 101 receives the file transfer packets, parses the data contained therein, and extracts the binary-to-product/version information. At 803, the vulnerability database system 101 stores the binary data with an index of the product and version combination. Thus, the vulnerability database system 101 reads the information received from the community client device 108 and stores it in the binaries-to-products mapping database 106, e.g., as shown in FIG. 2. Concurrent with or independent of 802 and 803, the vulnerability database system 101 also periodically downloads and processes (at 804) the public vulnerability data, the software product country of origin 122 and the hardware product country of origin 132. Thus, the vulnerability database system 101 receives, parses, processes and stores the known product vulnerability and severity information from the products and vulnerabilities information 109, the software product country of origin 122, and the hardware product country of origin 132 described above.

At 805, the vulnerability database system 101 stores the vulnerability data, the software product country of origin 122 and the hardware product country of origin 132 with an index of the product and version combination. Thus, the vulnerability database system 101 reads the information received from the products and vulnerabilities information 109, the software product country of origin 122 and the hardware product country of origin 132, and stores it in the binaries-to-products mapping database 107 (or the binaries-to-software product mapping database 124 or the binaries-to-hardware product mapping database 134, as shown in FIG. 3.

At 806, the vulnerability database system 101 processes the data from the two databases 106 and 107, 106 and 124 or 106 and 134, to generate the relationships between the binary data and the vulnerability data or the country of origin data. Thus, the vulnerability database system 101 reads and scans through the product and version combination information in the databases 106 and 107, 106 and 124 or 106 and 134, to find matching product data with which to generate, compile and store the data for the intermediate database 400, e.g., as shown in FIG. 4, thereby linking the binary files with the known vulnerabilities or countries of origin. The vulnerability database system 101 then reads and stores the binary files and the corresponding known vulnerabilities in the binaries-to-vulnerabilities mapping database 105, the binaries-to-software country of origin mapping database 126, or the binaries-to-hardware country of origin mapping database 136 e.g., as shown in FIG. 5.

FIG. 9 shows a simplified flow chart of a process 900 performed by the target device 103 to connect to the validation server 102. The particular steps, order of steps, and combination of steps is shown for explanatory purposes only. Other embodiments may use other steps or combinations of steps or in a different order to perform the same general function. Additionally, one or more applications or routines can perform the process 900.

Upon starting (at 901), the target device 103 connects (at 902) to the validation server 102 as an external file storage device. Thus, the target device 103 configures itself as a storage device when the validation server 102 establishes a communication link with it, e.g., via Firewire™, USB (Universal Serial Bus), WiFi, etc. In some embodiments, the target device 103 does not need to be in an operational state as long as the hosted files are accessible by the validation server 102. In such embodiments, the communication link with the validation server 102 may have to be wired, rather than wireless. In some embodiments, the user of the target device 103 turns off or powers down the target device 103, so that the target device 103 connects to the validation server 102 while turned off. Thus, when the validation server 102 attempts to connect to the target device 103, the target device 103 activates a functionality that allows access to its hard drive or mass storage device while the rest of the target device 103, including the CPU, remains powered down or turned off. The "target disk mode" function of some computer systems available from Apple Computer Corp. and the FlashMate™ alternative hybrid-drive functionality are examples of this technique of loading an unpowered target device as an external storage device.

FIG. 10 shows a simplified flow chart of a process 1000 performed by the validation server 102 to scan the target device 103 and generate the target device vulnerability report 117, target device software country of origin report 130 or the target device hardware country of origin report 140. The particular steps, order of steps, and combination of steps is shown for explanatory purposes only. Other embodiments may use other steps or combinations of steps or in a different order to perform the same general function. Additionally, one or more applications or routines can perform the process 1000.

Upon starting (at 1001), the validation server 102 downloads (at 1002) the binaries-to-vulnerabilities mapping database 105, the binaries-to-software country of origin mapping database 126, or the binaries-to-hardware country of origin mapping database 136 as an offline update package (e.g., the offline binaries-to-vulnerabilities mapping database 110, the offline software country of origin database 128 or the offline binaries-to-hardware country of origin mapping database 138). Thus, the validation server 102 receives and stores the product binary data and the product vulnerability data, the software product country of origin 122, or the hardware product country of origin 132. At 1003, the validation server 102 loads the target device 103 as an external file storage device. Thus, the validation server 102 establishes a communication link with the target device 103, the target device 103 configures itself as a storage device (as described above), and the validation server 102 configures itself to use the target device 103 as an external storage device.

At 1004, the validation server 102 scan the first binary file in the target device 103 against the offline version of the binaries-to-vulnerabilities mapping database 105, the binaries-to-software country of origin mapping database 126, or the binaries-to-hardware country of origin mapping database 136 (the offline binaries-to-vulnerabilities mapping database 110, the offline software country of origin database 128 or the offline binaries-to-hardware country of origin mapping database 138). Thus, the validation server 102 reads the target binary data from the first binary file of the target device 103 and searches through the target binary data to find matches between the target binary data and the product binary data in the offline binaries-to-vulnerabilities mapping database 110, the offline software country of origin database 128 or the offline binaries-to-hardware country of origin mapping database 138. A match indicates that the binary file contains a known vulnerability, as determined at 1005.

In some embodiments, the country of origin for the software component or the hardware component of the target device is determined. This is based on the results of the scanning and the correspondence between the product binary data and the product country of origin data. The validation server 102 may log (at 1006) the binary file name, the file path, the vulnerability information, and the country of origin. Thus, the validation server 102 reads and stores the relevant data from the target binary data and the offline binaries-to-vulnerabilities mapping database 110, the offline software country of origin database 128 or the offline binaries-to-hardware country of origin mapping database 138. If there was no match (at 1005) or after logging the data (at 1006), and if the validation server 102 has not reached the last binary file (as determined at 1007), then the validation server 102 selects (at 1008) the next binary file and repeats 1004-1008 until all of the binary files on the target device 103 have been scanned.

In some embodiments, the validation server 102 provides different levels of vulnerability assessment for the target device 103, and the validation server 102 receives an indication from the system administrator 119 of which level of vulnerability assessment that is to be performed on the target device 103. For example, a first vulnerability assessment level (referred to herein as a "quick" assessment) scans (at 1004-1008) only those executable binary files that the target device 103 actually runs or executes. A second vulnerability assessment level (referred to herein as a "deep" assessment) scans (at 1004-1008) the executable binary files that the target device 103 actually runs or executes along with the library files used by the executable binary files. A third vulnerability assessment level (referred to herein as a "full" assessment) scans (at 1004-1008) all of the binary files hosted or stored on the target device 103.

In some embodiments, the quick assessment and the deep assessment scan those binary files that the target device 103 is currently running or executing while the validation server 102 is receiving, reading and/or scanning them, which means that the target device 103 is powered on for these assessments. On the other hand, since the full assessment is not concerned with which binary files the target device 103 executes, this assessment can be performed with the target device 103 powered off. In some embodiments, the target device 103 maintains a stored list of the binary files that it has executed, has executed recently, or has executed most often. In this case, the validation server 102 downloads the stored list, so the quick and deep assessments can be performed with the target device 103 powered off.

After scanning the last binary file (as determined at 1007), the validation server 102 consolidates the scan results into the target device vulnerability report 117, the target device software country of origin report 130 or the target device hardware country of origin report 140 (at 1009). Thus, the validation server 102 assembles all of the target binary data and known vulnerability data or country of origin and stores it together in the target device vulnerability report 117, the target device software country of origin report 130 or the target device hardware country of origin report 140, e.g., as shown in FIG. 6.

FIG. 11 shows a simplified schematic diagram showing an example computing system(s) 1100 for use as the vulnerability database system 101, in accordance with some embodiments. Other embodiments may use other components and combinations of components. For example, the computing system 1100 may represent one or more physical computer devices, such as web servers, rack-mounted computers, network storage devices, desktop computers, laptop/ notebook computers, etc. In some embodiments implemented at least partially in a cloud network potentially with data synchronized across multiple geolocations, the computing system 1100 may be referred to as a cloud server or cloud database. In some embodiments, the functions of the computing system 1100 are enabled in a single computer device. In more complex implementations, some of the functions of the computing system 1100 are distributed across multiple computer devices, whether within a single server farm facility or multiple physical locations. In some embodiments wherein the computing system 1100 represents multiple computer devices, some of the functions of the computing device 1100 are implemented in some of the computer devices, while other functions are implemented in other computer devices. In the illustrated embodiment, the computing system 1100 generally includes at least one processor 1101, a main electronic memory 1102, a data storage 1103, a user I/O 1104, and a network I/O 1105, among other components not shown for simplicity, connected or coupled together by a data communication subsystem 1106.

The processor 1101 represents one or more central processing units on one or more PCBs in one or more housings or enclosures. In some embodiments, the processor 1101 represents multiple microprocessor units in multiple computer devices at multiple physical locations interconnected by one or more data channels, such as the Internet, a WAN, a LAN, etc. When executing computer-executable instructions for performing the above described functions of the vulnerability database system 101 in cooperation with the main electronic memory 1102, the processor 1101 becomes a special purpose computer for performing the functions of the instructions.

The main electronic memory 1102 represents one or more RAM modules on one or more PCBs in one or more housings or enclosures. In some embodiments, the main electronic memory 1102 represents multiple memory module units in multiple computer devices at multiple physical locations. In operation with the processor 1101, the main electronic memory 1102 stores the computer-executable instructions executed by, and data processed by, the processor 1101 to perform the above described functions of the vulnerability database system 101.

The data storage 1103 represents or comprises any appropriate number or combination of internal or external physical mass storage devices, such as hard drives, optical drives, network-attached storage (NAS) devices, flash drives, etc. In some embodiments, the data storage 1103 represents multiple mass storage devices in multiple computer devices at multiple physical locations. The data storage 1103 generally provides persistent storage 1107 (e.g., a non-transitory computer readable medium) for the programs (e.g., computer-executable instructions) and data used in operations described above for the vulnerability database system 101 (e.g., operations of the processor 1101 and the main electronic memory 1102), such as, but not limited to, the databases 105, 106 and 107 described above, a parsing routine 1108 (for parsing data), a searching routine 1109 (for searching through data for desired data), a comparing routine 1110 (for comparing different data to find a match), a reading routine 1111 (for reading data from the main electronic memory 1102 or persistent storage 1107), a storing routine 1112 (for storing data in the main electronic memory 1102 or persistent storage 1107), a network communication application 1113 (for generating/parsing data packets to transmit/receive data to/from the community client device 108, the products and vulnerabilities information 109, the software product country of origin 122 and the hardware product country of origin 132 and the validation server 102), and a database management application 1114 (for generating, managing and accessing the databases 105, 106 and 107), among others not shown for simplicity (such as 110, 124, 126, 128, 134, 136 and 138). Under control of these programs and using this data, the processor 1101, in cooperation with the main electronic memory 1102, performs the above described functions for the vulnerability database system 101.

The user I/O 1104 represents one or more appropriate user interface devices, such as keyboards, pointing devices, displays, etc. In some embodiments, the user I/O 1104 represents multiple user interface devices for multiple computer devices at multiple physical locations. A system administrator, for example, may use these devices to access, setup and control the computing system 1100.

The network I/O 1105 represents any appropriate networking devices, such as network adapters, etc. for communicating through a network, such as the Internet, a WAN, a LAN, etc. In some embodiments, the network I/O 1105 represents multiple such networking devices for multiple computer devices at multiple physical locations for communicating through multiple data channels. The computing system 1100 communicates with the community client device 108, the products and vulnerabilities information 109, the software product country of origin 122 and the hardware product country of origin 132, and the validation server 102 through the network I/O 1105 to send and receive data and requests for data in order to generate and share the databases 105, 106 and 107.

The data communication subsystem 1106 represents any appropriate communication hardware for connecting the other components in a single unit or in a distributed manner on one or more PCBs, within one or more housings or enclosures, within one or more rack assemblies, within one or more physical facilities, etc.

Figure 12:
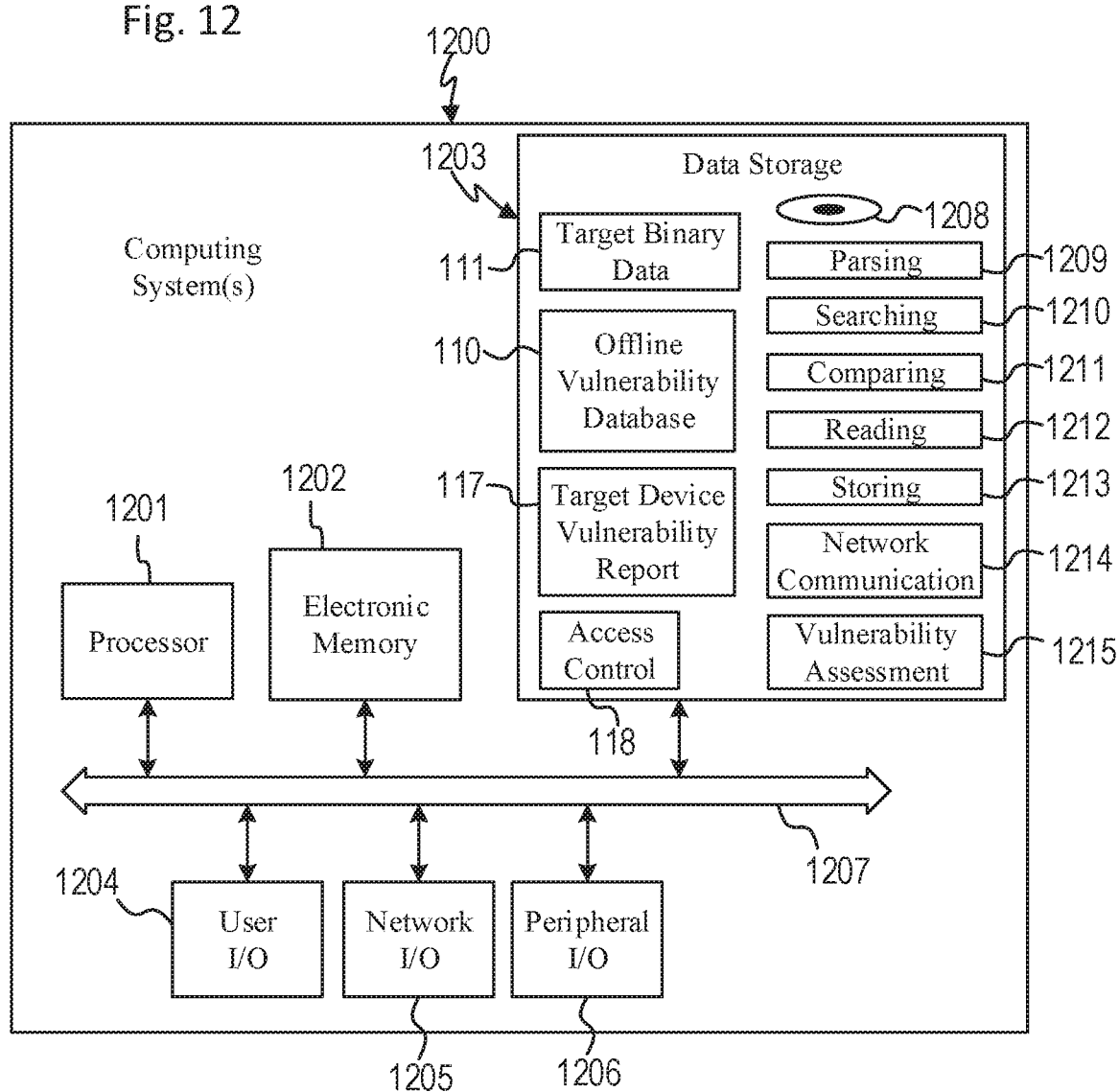
FIG. 12 is a simplified schematic diagram of a validation server for use in the example computer security vulnerability assessment system shown in FIGS. 1A-1D, in accordance with some embodiments.

FIG. 12 shows a simplified schematic diagram showing an example computing system(s) 1200 for use as the validation server 102, in accordance with some embodiments. Other embodiments may use other components and combinations of components. For example, the computing system 1200 may represent one or more physical computer devices, such as web servers, rack-mounted computers, network storage devices, desktop computers, laptop/notebook computers, etc. In some embodiments implemented at least partially in a cloud network potentially with data synchronized across multiple geolocations, the computing system 1200 may be referred to as a cloud server. In some embodiments, the functions of the computing system 1200 are enabled in a single computer device.

In more complex implementations, some of the functions of the computing system 1200 are distributed across multiple computer devices, whether within a single server farm facility or multiple physical locations. In some embodiments wherein the computing system 1200 represents multiple computer devices, some of the functions of the computing device 1200 are implemented in some of the computer devices, while other functions are implemented in other computer devices. In the illustrated embodiment, the computing system 1200 generally includes at least one processor 1201, a main electronic memory 1202, a data storage 1203, a user I/O 1204, a network I/O 1205, and a peripheral I/O 1206, among other components not shown for simplicity, connected or coupled together by a data communication subsystem 1207.

The processor 1201 represents one or more central processing units on one or more PCBs in one or more housings or enclosures. In some embodiments, the processor 1201 represents multiple microprocessor units in multiple computer devices at multiple physical locations interconnected by one or more data channels, such as the Internet, a WAN, a LAN, etc. When executing computer-executable instructions for performing the above described functions of the validation server 102 in cooperation with the main electronic memory 1202, the processor 1201 becomes a special purpose computer for performing the functions of the instructions.

The main electronic memory 1202 represents one or more RAM modules on one or more PCBs in one or more housings or enclosures. In some embodiments, the main electronic memory 1202 represents multiple memory module units in multiple computer devices at multiple physical locations. In operation with the processor 1201, the main electronic memory 1202 stores the computer-executable instructions executed by, and data processed by, the processor 1201 to perform the above described functions of the validation server 102.

The data storage 1203 represents or comprises any appropriate number or combination of internal or external physical mass storage devices, such as hard drives, optical drives, network-attached storage (NAS) devices, flash drives, etc. In some embodiments, the data storage 1203 represents multiple mass storage devices in multiple computer devices at multiple physical locations. The data storage 1203 generally provides persistent storage 1208 (e.g., a non-transitory computer readable medium) for the programs (e.g., computer-executable instructions) and data used in operations described above for the validation server 102 (e.g., operations of the processor 1201 and the main electronic memory 1202), such as, but not limited to, the target binary data 111, the offline binaries-to-vulnerabilities mapping database 110, the offline software country of origin database 128, the offline binaries-to-hardware country of origin mapping database 138, the target device vulnerability report 117, the target device software country of origin report 130 or the target device hardware country of origin report 140, the access control application 118, a parsing routine 1209 (for parsing data), a searching routine 1210 (for searching through data for desired data), a comparing routine 1211 (for comparing different data to find a match), a reading routine 1212 (for reading data from the main electronic memory 1202 or persistent storage 1208), a storing routine 1213 (for storing data in the main electronic memory 1202 or persistent storage 1208), a network communication application 1214 (for generating/parsing data packets to transmit/receive data to/from the vulnerability database system 101 and the secure environment 104), and a vulnerability assessment application 1215 (for managing the functions described above for performing the vulnerability assessment to determine the security vulnerability of the target device 103), among others not shown for simplicity. Under control of these programs and using this data, the processor 1201, in cooperation with the main electronic memory 1202, performs the above described functions for the validation server 102.

The user I/O 1204 represents one or more appropriate user interface devices, such as keyboards, pointing devices, displays, etc. In some embodiments, the user I/O 1204 represents multiple user interface devices for multiple computer devices at multiple physical locations. The system administrator 119, for example, may use these devices to access, setup and control the computing system 1200 and, in some embodiments, to review the target device vulnerability report 117 and determine whether to grant access by the target device 103 to the secure environment 104.

The network I/O 1205 represents any appropriate networking devices, such as network adapters, etc. for communicating through a network, such as the Internet, a WAN, a LAN, etc. In some embodiments, the network I/O 1205 represents multiple such networking devices for multiple computer devices at multiple physical locations for communicating through multiple data channels. The computing system 1200 communicates with the vulnerability database system 101 and the secure environment 104 through the network I/O 1205 to send and receive data and requests for data (e.g., for the offline binaries-to-vulnerabilities mapping database 110, the offline software country of origin database 128, or the offline binaries-to-hardware country of origin mapping database 138,) in order to perform the vulnerability assessment and generate the target device vulnerability report 117, the target device software country of origin report 130 or the target device hardware country of origin report 140.

The peripheral I/O 1206 represents any appropriate peripheral interface devices, such as serial ports, parallel ports, USB ports, Firewire™ ports, SCSI (Small Computer System Interface) ports, PCI (Peripheral Component Interconnect) ports, etc. In some embodiments, the peripheral I/O 1206 represents multiple such peripheral interface devices for multiple computer devices at multiple physical locations for communicating through multiple protocols. The computing system 1200 communicates with the target device 103 through the peripheral I/O 1206 to send and receive data and requests for data in order to receive the target binary data 111 in order to perform the vulnerability assessment and generate the target device vulnerability assessment result or report 117, the target device software country of origin report 130 or the target device hardware country of origin report 140.

The data communication subsystem 1207 represents any appropriate communication hardware for connecting the other components in a single unit or in a distributed manner on one or more PCBs, within one or more housings or enclosures, within one or more rack assemblies, within one or more physical facilities, etc.

Various features of the computer security vulnerability assessment system 100 represent improvements in various different fields. For example, the use of the binary data with the binaries-to-vulnerabilities mapping database 105 (the binaries-to-software country of origin mapping database 126, or the binaries-to-hardware country of origin mapping database 136) and the use of the turned-off target device 103 as an external storage device represent improvements in the fields of security vulnerability assessment, secure domain or network access control, database generation and maintenance, and computer system security. In particular, these features enable a more thorough, more robust and more flexible system, since they operate with binary data mapped to vulnerability data or country of origin data, instead of, or in addition to, operating with application file names or other high level meta data. Additionally, these features enable a more secure system, since they operate with a turned-off target device, instead of a turn-on target device in which ongoing operations could affect the vulnerability assessment or audit. Furthermore, these features may also represent improvements in additional fields, and other features may represent improvements in these and other fields.

The computer security vulnerability assessment system 100 described above also addresses the Internet-centric challenge of coordinating among different entities to manage communications, collect electronic information from disparate data sources across the Internet, and enable enhanced computer security vulnerability assessment and target device validation at various desired locations. Additionally, the computer security vulnerability assessment system 100 described above does not preempt the field of security vulnerability assessment, because many other techniques for security vulnerability assessment are readily available; whereas the technique described herein is simply directed to the improvements thus enabled. Furthermore, it is noted that the security vulnerability assessment features make sense only in the context of a computing system, since significant portions of the features involve complex traversal of a very large quantity of data with highly complicated interrelations and calculations and functions that a person would not need or be able to perform. In particular, a human cannot read through the binary data used by the present system.

Although embodiments of the invention have been discussed primarily with respect to specific embodiments thereof, other variations are possible. Various configurations of the described structures or processes may be used in place of, or in addition to, the configurations presented herein.

Those skilled in the art will appreciate that the foregoing description is by way of example only, and is not intended to limit the invention. Nothing in the disclosure should indicate that the invention is limited to systems that are implemented on a single computerized system. In general, any diagrams presented are only intended to indicate one possible configuration, and many variations are possible. Those skilled in the art will also appreciate that methods and systems consistent with the present invention are suitable for use in a wide range of applications encompassing NAC systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method comprising:
   receiving, by a computerized system, product binary data and first product identification data that correspond to each other, the product binary data includes hashes of strings of bits, bytes, words or characters extracted from a file of a product;
   receiving, by the computerized system, product vulnerability data and second product identification data that correspond to each other;
   determining, by the computerized system, correspondence between the product binary data and the product vulnerability data based on matching the first product identification data with the second product identification data, wherein the product vulnerability data includes a country of origin for a product identified by the second product identification data;
   generating, by the computerized system, a binaries-to-vulnerabilities database based on a determined correspondence between the product binary data and the product vulnerability data;
   scanning, by the computerized system using the binaries-to-vulnerabilities database, target binary data from a target device to find matches between the target binary data and the product binary data; and
   determining, by the computerized system, a known security vulnerability of the target device based on results of the scanning and the correspondence between the product binary data and the product vulnerability data, wherein the known security vulnerability includes the country of origin for the product in the target device.

2. The method of claim 1, wherein the country of origin is generated from a signing authority, public address, public information or a press release.

3. The method of claim 1, wherein the country of origin is associated with a name of the product and an address of a business entity that makes or markets the product.

4. The method of claim 1, further comprising:
   generating, by the computerized system, an assessment result associating the product in the target device with the country of origin.

5. The method of claim 1, wherein the binaries-to-vulnerabilities database is downloaded and used offline.

6. The method of claim 1, wherein:
   the receiving of the product binary data and the first product identification data further comprises collecting, by the computerized system, the product binary data and the first product identification data from a plurality of client devices; and
   each client device collects the product binary data and the first product identification data related to the product that is on the client device and maps the product binary data to a corresponding first product identification data for the product.

7. The method of claim 1, further comprising:
   granting, by the computerized system, access by the target device to a secure environment based on determining that the target device has no known security vulnerability; and
   denying, by the computerized system, access by the target device to the secure environment based on determining that the target device has the known security vulnerability.

8. The method of claim 1, wherein the target device is a computer that has been turned off.

9. The method of claim 1, further comprising:
   establishing, by the computerized system, a communication connection to the target device by loading the target device as an external storage device of the computerized system.

10. A method comprising:
    receiving, by a computerized system, product binary data and first product identification data that correspond to each other, the product binary data includes hashes of strings of bits, bytes, words or characters extracted from files of software products;
    receiving, by the computerized system, product country of origin data and second product identification data that correspond to each other;
    determining, by the computerized system, correspondence between the product binary data and the product country of origin data based on matching the first product identification data with the second product identification data;
    generating, by the computerized system, a binaries-to-country of origin database based on a determined correspondence between the product binary data and the product country of origin data;
    scanning, by the computerized system using the binaries-to-country of origin database, target binary data from a target device to find matches between the target binary data and the product binary data; and
    determining, by the computerized system, a country of origin for a product of the target device based on results of the scanning and the correspondence between the product binary data and the product country of origin data.

11. The method of claim 10, wherein the country of origin is generated from a signing authority, public address, public information or a press release.

12. The method of claim 10, wherein the country of origin is associated with a name of the product and an address of a business entity that makes or markets the product.

13. The method of claim 10, further comprising:
    generating, by the computerized system, an assessment result associating the product in the target device with the country of origin.

14. The method of claim 10, wherein the binaries-to-country of origin database is downloaded and used offline.

15. The method of claim 10, wherein:
    the receiving of the product binary data and the first product identification data further comprises collecting, by the computerized system, the product binary data and the first product identification data from a plurality of client devices; and
    each client device collects the product binary data and the first product identification data related to the product that is on the client device and maps the product binary data to a corresponding first product identification data for the product.

16. The method of claim 10, further comprising:
granting, by the computerized system, access by the target device to a secure environment based on determining that the target device has no known security vulnerability; and
denying, by the computerized system, access by the target device to the secure environment based on determining that the target device has the known security vulnerability.

17. The method of claim 10, wherein the target device is a computer that has been turned off.

18. The method of claim 10, further comprising:
establishing, by the computerized system, a communication connection to the target device by loading the target device as an external storage device of the computerized system.

* * * * *